United States Patent
Zarna et al.

(10) Patent No.: US 6,550,864 B1
(45) Date of Patent: Apr. 22, 2003

(54) SEATBACK LATCH MECHANISM WITH PIVOTING LOCKING PIN

(75) Inventors: William Zarna, Macomb, MI (US); Rick L. Ohsiek, Sterling Heights, MI (US); Shihong Yu, Troy, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/816,052

(22) Filed: Mar. 23, 2001

Related U.S. Application Data

(63) Continuation-in-part of application No. 09/407,494, filed on Sep. 28, 1999, now Pat. No. 6,290,297, which is a continuation-in-part of application No. 09/136,132, filed on Aug. 18, 1998, now Pat. No. 6,161,899.

(51) Int. Cl.$^7$ ................................................. B60N 2/02
(52) U.S. Cl. ................................................. 297/378.12
(58) Field of Search ........................... 297/378.12, 366, 297/367, 368, 369, 378.1

(56) References Cited

U.S. PATENT DOCUMENTS

| | | | | |
|---|---|---|---|---|
| 3,893,206 A | * | 7/1975 | Pickles et al. |
| 4,010,979 A | * | 3/1977 | Fisher, III et al. |
| 4,076,309 A | * | 2/1978 | Chekirda et al. |
| 4,103,970 A | * | 8/1978 | Homier |
| 4,219,234 A | * | 8/1980 | Bell |
| 4,484,779 A | * | 11/1984 | Suzuki |
| 4,579,387 A | * | 4/1986 | Bell |
| 4,634,182 A | * | 1/1987 | Tanaka |
| 4,645,263 A | * | 2/1987 | Fourrey et al. |
| 4,659,146 A | * | 4/1987 | Janiaud |
| 4,687,252 A | * | 8/1987 | Bell et al. |
| 4,720,145 A | * | 1/1988 | Bell |
| 4,733,912 A | * | 3/1988 | Second |
| 4,747,641 A | * | 5/1988 | Bell |
| 4,789,205 A | * | 12/1988 | Pipon et al. |
| 4,795,213 A | * | 1/1989 | Bell |
| 4,822,100 A | * | 4/1989 | Bell |
| 4,874,205 A | * | 10/1989 | Arefinejad et al. |
| 5,265,937 A | * | 11/1993 | Allen |
| 5,380,060 A | * | 1/1995 | Sponsler et al. |
| 5,425,568 A | * | 6/1995 | Sliney et al. |
| 5,460,429 A | * | 10/1995 | Whalen |
| 5,476,307 A | * | 12/1995 | Whalen |
| 5,492,389 A | * | 2/1996 | McClintock et al. |
| 5,590,932 A | * | 1/1997 | Olivieri |
| 5,718,482 A | * | 2/1998 | Robinson |
| 5,749,625 A | * | 5/1998 | Robinson |
| 5,749,626 A | * | 5/1998 | Yoshida |
| 5,938,286 A | * | 8/1999 | Jones et al. |
| 5,951,108 A | * | 9/1999 | Bauer et al. |

* cited by examiner

Primary Examiner—Milton Nelson, Jr.

(57) ABSTRACT

A seatback latch mechanism is provided for locking a seatback in one of either an upright position or a fold-forward position relative to a seat. The seatback latch mechanism includes a lower quadrant rotatably supporting an upper quadrant. A lock cam and lock pin are each rotatably supported by the upper quadrant. A first surface of the lock pin interfaces the lock cam and a second surface of the lock pin interfaces the lower quadrant. The lock cam is biased to selectively force the lock pin into engagement with the lower quadrant for locking the upper quadrant relative to the lower quadrant in either of two positions. When the upper quadrant pivots relative to the lower quadrant, the lock pin rotates relative to the upper quadrant.

17 Claims, 5 Drawing Sheets

US 6,550,864 B1

SEATBACK LATCH MECHANISM WITH PIVOTING LOCKING PIN

CROSS-REFERENCE TO RELATED APPLICATIONS

The present invention is a continuation-in-part of U.S. Ser. No. 09/407,494, filed Sep. 28, 1999, now U.S. Pat. No. 6,290,297, which is a continuation-in-part of Ser. No. 09/136,132 filed Aug. 18, 1998 now U.S. Pat. No. 6,161,899, issued Dec. 19, 2000, both expressly incorporated herein by reference.

FIELD OF THE INVENTION

The present invention generally relates to seatback fold-forward mechanisms and more particularly to an improved seatback latch mechanism.

SUMMARY OF THE INVENTION

The present invention includes a seatback latch mechanism having an upper quadrant and a lock cam and lock pin each rotatably supported by the upper quadrant and a lower quadrant. The cam and the lock pin cooperate to selectively lock the upper quadrant in one of a first or second rotational position relative to the lower quadrant. A first surface of the lock pin is in selective contact with the cam to lock the upper quadrant relative the lower quadrant, which pivotally supports the upper quadrant. A second side of said lock pin is in sliding contact with the lower quadrant.

In a preferred embodiment, the present invention is included with a reclining seat assembly. The reclining seat assembly includes a seat, a seatback pivotal relative to the seat, and a seatback latch mechanism interconnecting the seat and seatback. The seatback latch mechanism includes upper and lower quadrants, and a lock cam and lock pin rotatably supported by the upper quadrant. The lower quadrant pivotally supports the upper quadrant. A first surface of the lock pin is in selective contact with the cam, and a second surface of the lock pin is in sliding contact with the lower quadrant. The lock cam and the lock pin cooperate to selectively lock the seatback in first and second rotational positions relative to the seat. A linear recliner mechanism is in mechanical communication with the seatback latch mechanism for reclining the seatback relative to the seat.

DETAILED DESCRIPTION OF THE PREFERRED EMBODIMENTS

Figure 1:
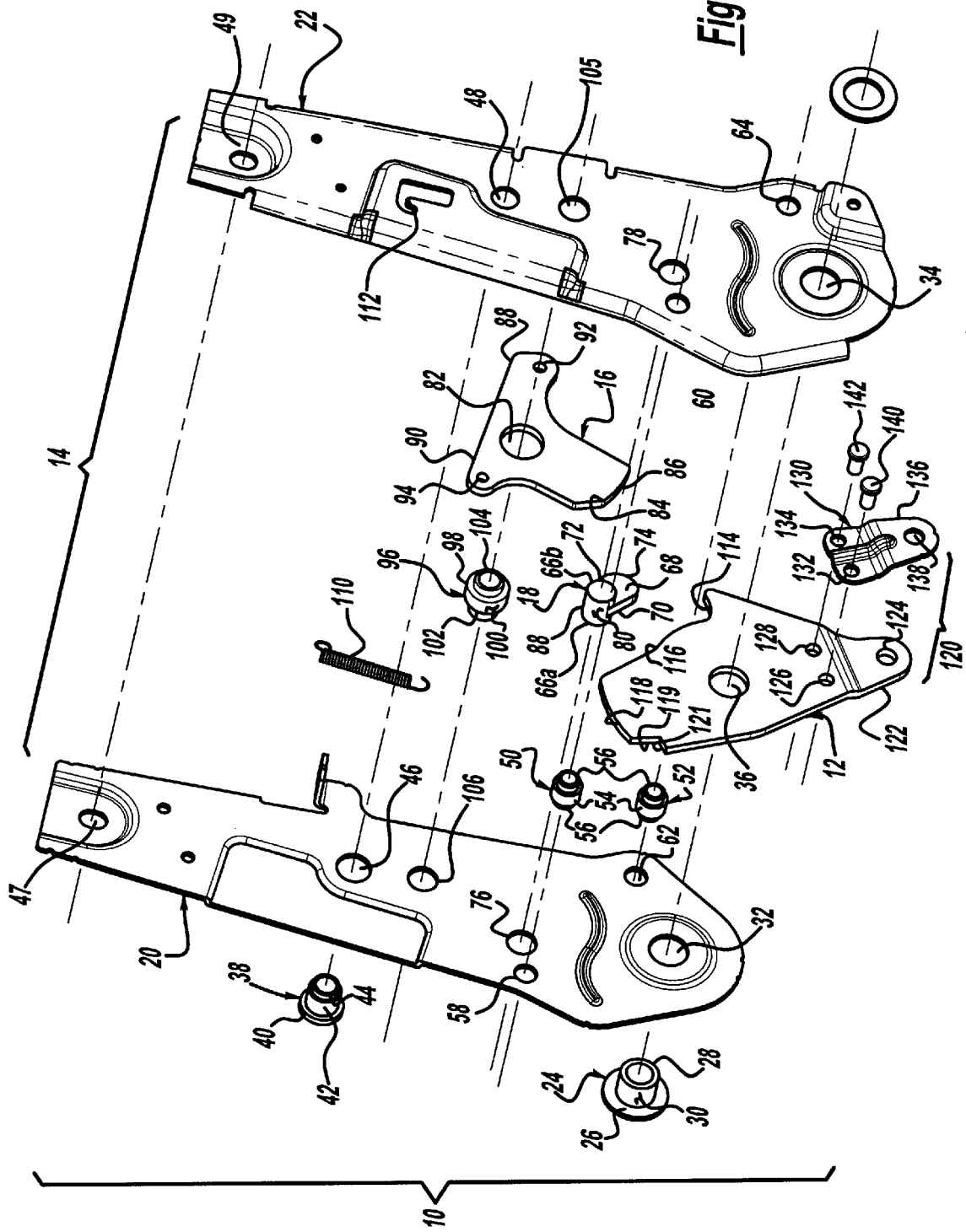
FIG. 1 is an exploded view of the seatback latch mechanism according to the present invention.

With reference to the Figures, a seatback latch mechanism 10 will be described in detail. The seatback latch mechanism 10 includes a lower quadrant 12 that pivotally supports an upper quadrant 14. The upper quadrant 14 is selectively adjustable relative to the lower quadrant 12 by way of a lock cam 16 and lock pin 18 arrangement disposed therebetween.

The upper quadrant 14 includes first and second quadrant plates 20,22, which are pivotally supported on the lower quadrant 12 about a central pivot pin 24. The central pivot pin 24 includes a disc end 26 having a cylindrical body 28 extending coaxially therefrom. The cylindrical body 28 includes an exterior bearing surface 30, and is received through apertures 32,34 of the first and second quadrant plates 20,22, respectively, and an aperture 36 of the lower quadrant 12. The upper quadrant 14 further includes a spacer 38 intermediately received by the upper quadrant 14. The spacer 38 includes a disc end 40 having a first cylindrical body 42 extending coaxially therefrom. A second cylindrical body 44, generally smaller in diameter than the first cylindrical body 42, extends coaxially from an end of the first cylindrical body 42. The first cylindrical body 42 of the spacer 38 is initially received through an aperture 46 of the first quadrant plate 20. The second quadrant plate 22 includes an aperture 48 that is aligned with the aperture 46 of the first quadrant plate 20 and has a diameter complimentary to the second cylindrical body 44, which is received by the aperture 48. The first and second quadrant plates 20,22 include apertures 47,49, respectively, for securing an external structure (not shown) to the upper quadrant 14.

First and second support pins 50,52 are disposed between the first and second quadrant plates 20,22, and each include a main cylindrical body 54 having smaller cylindrical bodies 56 extending from either side. The cylindrical bodies 56 of the first support pin 50 are received into apertures 58,60 of the first and second quadrant plates, 20,22 respectively, thus supporting the first support pin 50 therebetween. The second support pin 52 is similarly supported between the first and second quadrant plates 20,22 by apertures 62,64, respectively.

The lock cam 16 and lock pin 18 are each pivotally supported between the first and second quadrant plates 20,22. The lock cam 16 and lock pin 18 function to retain the upper quadrant 14 in a rotational position relative to the lower quadrant 12. By operating the lock cam 16, the rotational position of the upper quadrant 14 is adjustable relative to the lower quadrant 12. The lock pin 18 secures the upper quadrant 14 in one of its positions relative the lower quadrant 12.

The lock pin 18 includes a cylindrical body 66 having a tab 68 extending therefrom. The tab 68 includes first and second surfaces 70,72 interconnected by an arcuate face 74. Ends 66a,66b of the cylindrical body 66 are each received into apertures 76,78 of the first and second quadrant plates 20,22, respectively, rotatably supporting the lock pin 18 therebetween. The cylindrical body 66 further includes an external bearing surface 80 that enables the lock pin 18 to easily rotate within the apertures 76,78.

The lock cam 16 includes a centrally disposed aperture 82 and a first edge 84 having a cam surface 86. The lock cam 16 further includes first and second, oppositely extending arms 88,90, having apertures 92,94, respectively, disposed therethrough. The lock cam 16 is rotatably supported between the first and second quadrant plates 20,22 about a cam pivot 96 received in the aperture 82. The lock cam 16 is biased in a first rotational direction by a spring 110. A first end of the spring 110 is attached to the second arm 90 at the aperture 94 and a second end of the spring 110 is attached to a bracket 112 formed into the second quadrant plate 22.

The cam pivot 96 includes a cylindrical portion 98 having a bearing surface 100 and first and second cylindrical extensions 102,104. The first and second cylindrical extensions 102,104 are supported within apertures 106,108 of the first and second quadrant plates 20,22, respectively, and the cylindrical portion 98 is disposed within the aperture 82 of the lock cam 16, whereby the lock cam 16 is free to rotate about the bearing surface 100.

As discussed previously, the lower quadrant 12 includes a centrally disposed aperture 36 for pivotally supporting the upper quadrant 14. The lower quadrant 12 further includes a shoulder 114, a first edge 116 extending upward from the shoulder 114, a second edge 118 that is generally arcuate in form and intersects the first edge 116, a third edge 119 that intersects the second edge 118 forming a corner, and a fourth edge 121 intersecting the third edge 119 forming a corner. As described in further detail hereinbelow, the lock pin 18 interfaces with the first edge 116 to selectively lock the upper quadrant 14 in an upright position or the third and fourth edges 119,121 to selectively lock the upper quadrant in a fold forward position.

The lower quadrant 12 further includes a bracket assembly 120 disposed at a lower end thereof. A first half of the bracket assembly 120 includes a stepped portion 122 of the lower quadrant 12 having a link aperture 124 therein. First and second rivet apertures 126,128 are also included and are positioned immediately above the stepped portion 122. The bracket assembly 120 also includes a mating bracket 130 that attaches to the lower quadrant 12. The mating bracket 130 includes first and second rivet apertures 132,134 and a stepped portion 136 having a link aperture 138, therethrough. The first and second rivet apertures 126,128 of the lower quadrant 12 respectively align with the first and second rivet apertures 132,134 of the mating bracket for receiving first and second rivets 140,142 therethrough. The first and second rivets 140,142 attach the mating bracket 130 to the lower quadrant 12 whereby the link apertures 124,138 coaxially align with one another.

Figure 2:
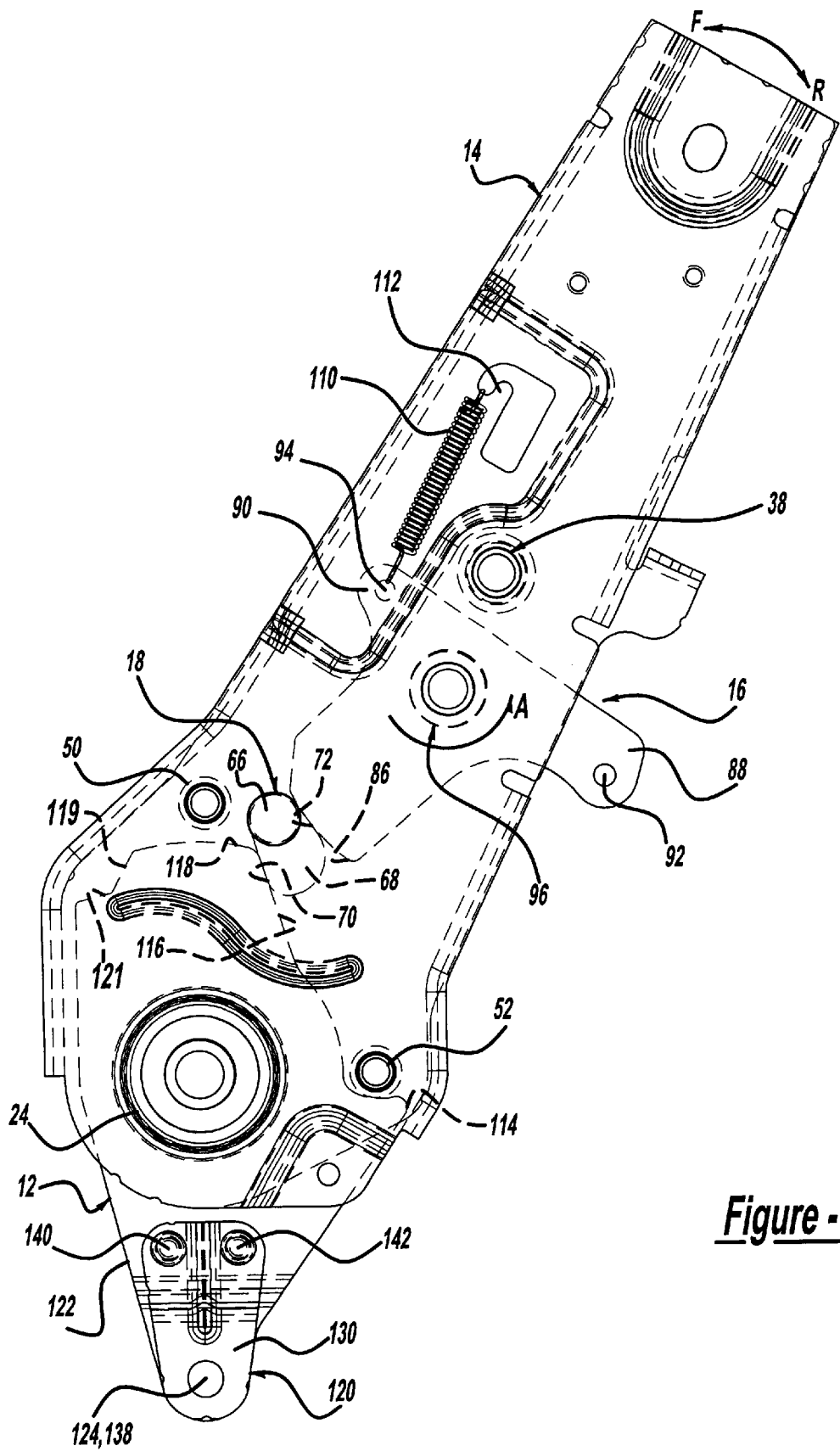
FIG. 2 is a side view of the seatback latch mechanism of FIG. 1 in an upright, locked position.

With particular reference to FIG. 2, the seatback latch mechanism 10 is shown in an upright, locked position. In the upright position, the second support pin 52 seats against the shoulder 114 of the lower quadrant 12. Thus, the second support pin functions as a stop to prohibit rearward rotation (arrow R) of the upper quadrant 14 relative to the lower quadrant 12. The lock pin 18 also prevents forward rotation of the upper quadrant 14 with respect to the lower quadrant 12 through interaction of the lock pin 18 and cam 16. The first side 70 of the tab 68 of the lock pin 18 abuts the first edge 116 of the lower quadrant 12 and the second side 72 of the tab 68 abuts the cam surface 86 of the lock cam 16. The spring 110 rotationally biases the cam surface 86 of the lock cam 16 into contact with the second side 72 of the tab 68, thereby forcing the first side 70 of the tab 68 against the first edge 116, thus preventing forward rotation of the upper quadrant 14 relative to the lower quadrant 12.

Figure 3:
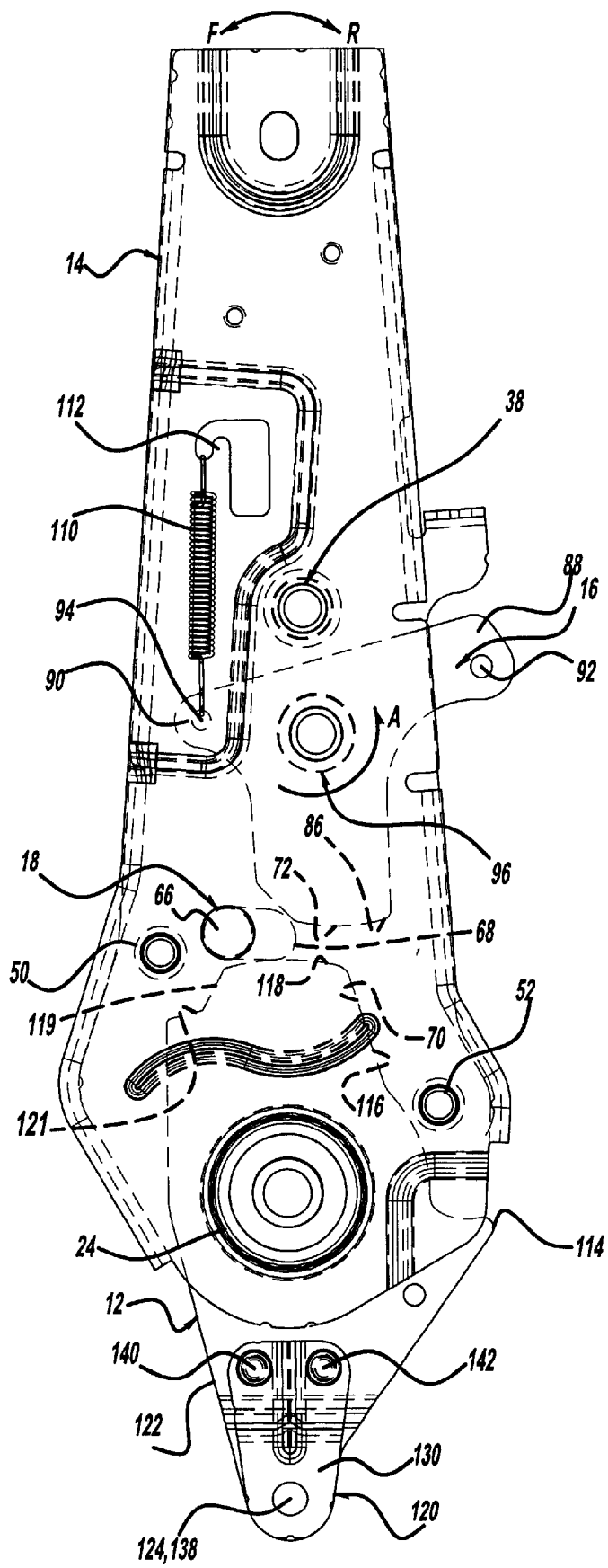
FIG. 3 is a side view of the seatback latch mechanism of FIG. 2 in a mid-fold position.
Figure 4:
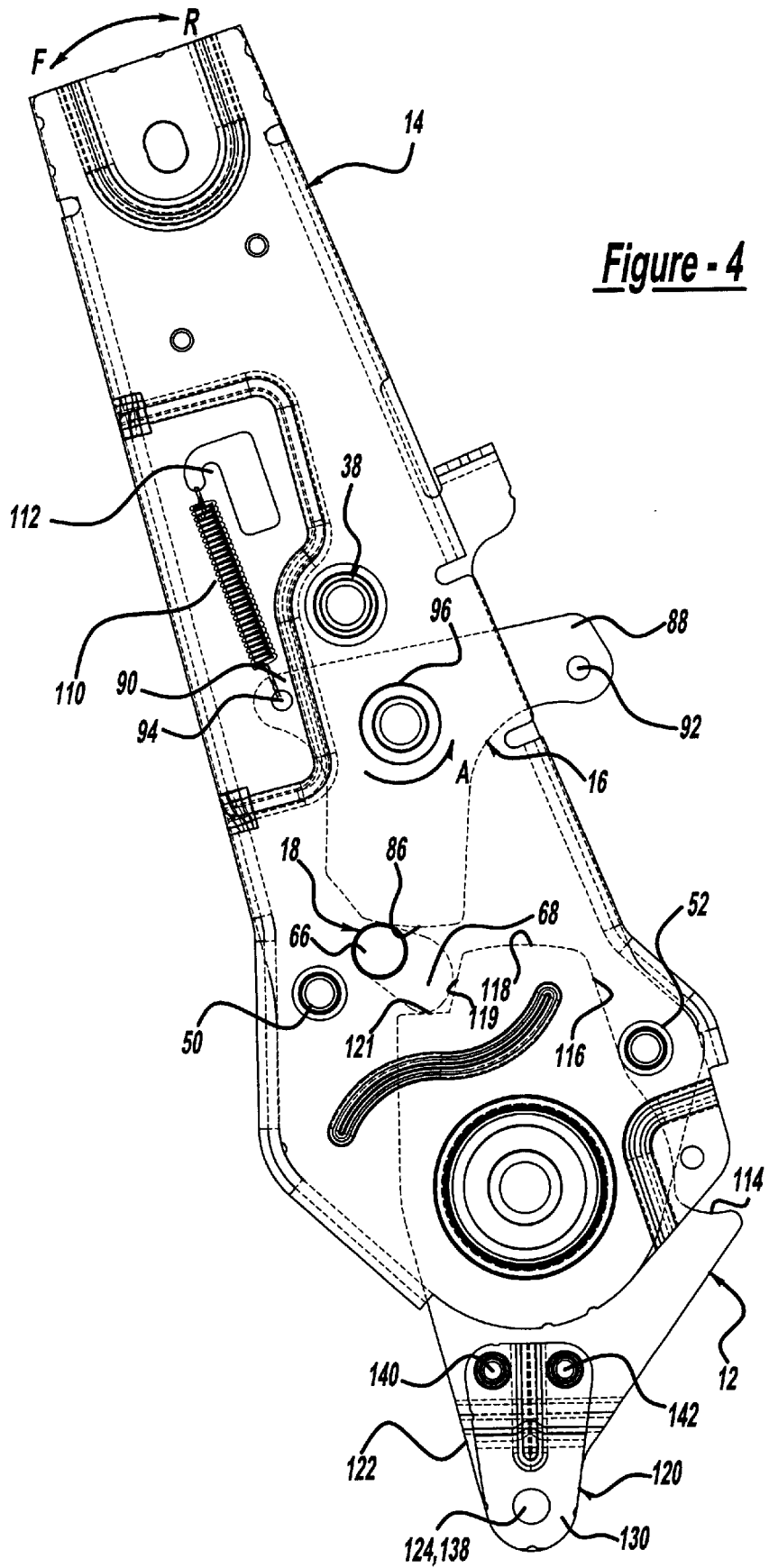
FIG. 4 is a side view of the seatback latch mechanism of FIG. 2 in a fold-forward position; an FIG. 5 is a schematic view of a reclining seat assembly incorporating the seatback latch mechanism of FIGS. 1–3.

To enable forward rotation of the upper quadrant 14 relative to the lower quadrant 12, the lock cam 16 is rotated (in the direction of arrow A) about the cam pivot 96 against the biasing force of the spring 110. As the lock cam 16 rotates against the biasing force of the spring 110, the cam surface 86 disengages the second side of the tab 72, whereby the lock pin 18 is no longer forced against the first edge 116 of the lower quadrant 12. As the upper quadrant 14 is caused to rotate forward (arrow F), the first side 70 of the tab 68 slides along the first edge 116 toward and eventually along the second edge 118 of the lower quadrant 12, whereby the lock pin 18 is caused to pivot within the apertures 76,78, as best illustrated in FIG. 3. After sufficient forward rotation of the upper quadrant 14, the tab 68 falls out of contact with the second edge 118 of the lower quadrant 12 and into contact with the third and fourth edges 119,121 of the lower quadrant 12.

After achieving full-forward rotation and releasing the lock cam 16, the spring 110 again biases the cam surface 86 into engagement with the tab 68 of the lock pin 18. In this manner, the lock pin 18 is pressed into engagement with the third and fourth edges 119,121 of the lower quadrant 12. In this position, the lock pin 18 prevents rearward rotation of the upper quadrant 14 relative to the lower quadrant 12. Thus, the upper quadrant 14 is effectively locked in the fold-forward position.

To return the upper quadrant 14 to the upright position relative to the lower quadrant 12, the lock cam 16 is again operated to rotate against the biasing force of the spring 110, whereby the cam surface 86 is disengaged from the tab 68 of the lock pin 18. Thus, the lock pin 18 is free to rotate within the apertures 76,78 as the upper quadrant 14 is folded backward relative to the lower quadrant 12 and the tab 68 of the lock pin 18 rides along the second edge 118 toward the first edge 116. When the lock cam 16 is then released, the biasing force of the spring 110 forces the cam surface 86 into engagement with the tab 68 of the lock pin 18 (as shown and described with respect to FIG. 2). In this position, the upper quadrant 14 is locked in the upright position relative to the lower quadrant 12.

Figure 5:
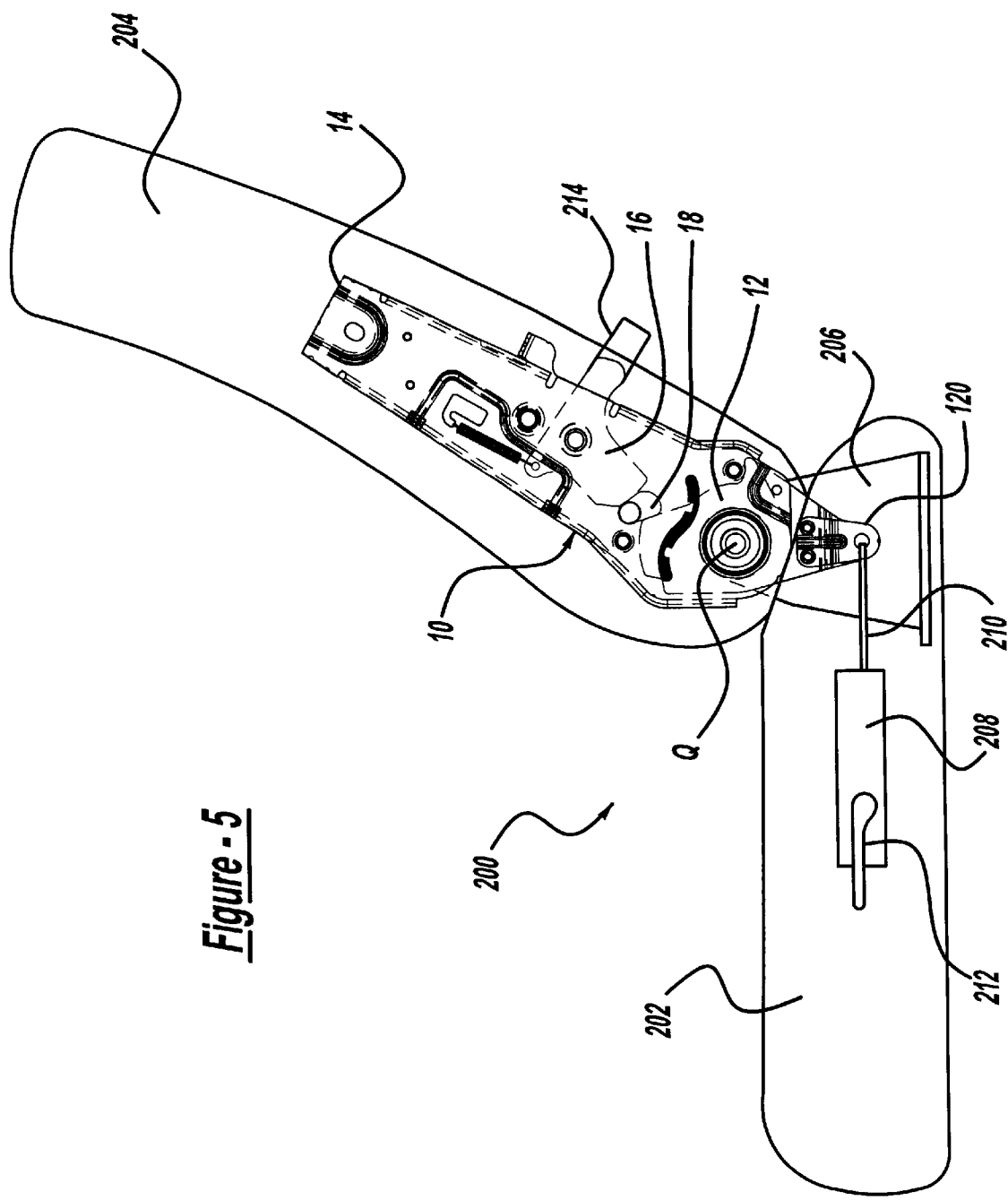

Referencing FIG. 5, the seatback latch mechanism 10 is included with a reclining seat assembly 200. The seat assembly 200 includes a seat 202 and a seatback 204 that is pivotal relative to the seat 202. The seatback 204 is supported by the seatback latch mechanism 10. The seatback latch mechanism 10 is supported by a bracket 206 and is pivotable about a pivot point Q. The pivot point Q is generally aligned with the center of rotation of the central pivot pin 24. The reclining seat assembly 200 preferably includes a linear recliner mechanism 208 disposed within the seat 202. The linear recliner mechanism 208 includes a recliner rod 210 that is connected to the bracket assembly 120 of the lower quadrant 12 through link apertures 124,138. The recliner rod 210 is adjustable, enabling pivotal adjustment of the seatback 204 relative to the seat 202. A handle 214 is further included and is in mechanical communication with the linear recliner mechanism 208 for operating the linear recliner mechanism 208. Another handle 214 is attached to the lock cam 16 via aperture 92 in arm 88 for actuating the seatback latch mechanism 10, as described in detail above. It should be noted, however, that while the preferred embodiment of the present invention implements a linear recliner mechanism 208 for providing pivotal adjustment of the seatback 204 relative to the seat 202, it is anticipated that other recliner mechanisms known in the art may be used.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. A seatback latch mechanism comprising:

an upper quadrant;

a lower quadrant rotatably supporting said upper quadrant between a first and second rotational position;

a lock cam having a cam surface and rotatably supported by said upper quadrant; and a lock pin rotatably supported by said upper quadrant and including a first surface in selective contact with said lock cam and a second surface in sliding contact with said lower quadrant, said lock cam being biased into engagement with said lock pin to lock said upper quadrant in one of said first and second rotational positions relative to said lower quadrant.

2. The seatback latch mechanism of claim 1, wherein said lock cam is rotatable between an engaged position and a released position, said cam surface urging said lock pin against said lower quadrant in said engaged position and said cam surface releasing from engagement with said lock pin in said released position.

3. The seatback latch mechanism of claim 2 further comprising a spring biasing said lock cam to said engaged position.

4. The seatback latch mechanism of claim 1, further comprising a support pin supported by said upper quadrant, said support pin abuts said lower quadrant to block rotation of said upper quadrant beyond said first and second rotational positions and define a range of rotation of said upper quadrant relative to said lower quadrant.

5. The seatback latch mechanism of claim 1 wherein said lock pin engages said lock cam and rotates within said upper quadrant in response to rotation of said upper quadrant relative to said lower quadrant.

6. The seatback latch mechanism of claim 1, wherein said lock cam is biased into engagement with said lock pin to lock said quadrant in both said first and second rotational positions relative said lower quadrant.

7. A reclining seat assembly comprising:

a seat;

a seatback adjustably mounted to said seat;

a seatback latch mechanism interconnecting said seat and seatback, and including:

an upper quadrant supporting said seatback;

a lower quadrant disposed within said seat and rotatably supporting said upper quadrant in first and second rotational positions;

a lock cam having a cam surface and rotatably supported by said upper quadrant;

a lock pin rotatably supported by said upper quadrant and including a first surface in selective contact with said lock cam and a second surface in sliding contact with said lower quadrant, said lock cam being biased into engagement with said lock pin to selectively lock said seatback in one of said first and second rotational positions relative to said seat; and a recliner mechanism in mechanical communication with said seatback latch mechanism for reclining said seatback relative to said seat.

8. The reclining seat assembly of claim 7 further comprising a spring biasing said lock cam to said engaged position.

9. The reclining seat assembly of claim 7, further comprising a support pin supported by said upper quadrant, said support pin abuts said lower quadrant to block rotation of said upper quadrant beyond said first and second rotational positions and define a range of rotation of said upper quadrant relative to said lower quadrant.

10. The reclining seat assembly of claim 7 wherein said lock pin engages said lock cam and rotates within said upper quadrant in response to rotation of said upper quadrant relative to said lower quadrant.

11. The reclining seat assembly of claim 7, wherein said lock cam is rotatable between an engaged position and a released position, said cam surface urging said lock pin against said lower quadrant in said engaged position and said cam surface releasing from engagement with said lock pin in said released position.

12. The reclining seat assembly of claim 7, wherein said lock cam is biased into engagement with said lock pin to lock said quadrant in both said first and second rotational positions relative said lower quadrant.

13. A seatback latch mechanism comprising:

a lower quadrant having a cam segment defining first and second locking surfaces;

an upper quadrant pivotally coupled to said lower quadrant for movement between a first rotational position and a second rotational position;

a lock pin pivotally supported by said upper quadrant and engaging said first locking surface when said upper quadrant is in said first rotational position and engaging said second locking surface when said upper quadrant is in said second rotational position; and a lock cam having a cam surface and pivotally supported by said upper quadrant for movement between an engaged position whereat said cam surface urges said lock pin against one of said first and second locking surfaces and a released position whereat said cam surface is released from engagement with said lock pin.

14. The seatback latch mechanism of claim 13, further comprising a support pin supported by said upper quadrant, said support pin abuts said lower quadrant to block rotation of said upper quadrant beyond said first and second rotational positions and define a range of rotation of said upper quadrant relative to said lower quadrant.

15. The seatback latch mechanism of claim 13 wherein said lock pin engages said lock cam and rotates within said upper quadrant in response to rotation of said upper quadrant relative to said lower quadrant.

16. The seatback latch mechanism of claim 13, wherein said lock cam is rotatable between an engaged position and a released position, said cam surface urging said lock pin against said lower quadrant in said engaged position and said cam surface releasing from engagement with said lock pin in said second position.

17. The seatback latch mechanism of claim 13 further comprising a spring biasing said lock cam to said engaged position.

* * * * *